United States Patent
Fujiyama et al.

(10) Patent No.: US 8,419,036 B2
(45) Date of Patent: Apr. 16, 2013

(54) SADDLED VEHICLE

(75) Inventors: Kotaro Fujiyama, Wako (JP); Hideaki Nakagawa, Wako (JP); Satoru Ikami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/389,619

(22) PCT Filed: Jul. 5, 2010

(86) PCT No.: PCT/JP2010/004374
§ 371 (c)(1),
(2), (4) Date: Feb. 9, 2012

(87) PCT Pub. No.: WO2011/024369
PCT Pub. Date: Mar. 3, 2011

(65) Prior Publication Data
US 2012/0175181 A1    Jul. 12, 2012

(30) Foreign Application Priority Data
Aug. 25, 2009  (JP) .................................. 2009-194736

(51) Int. Cl.
*B62K 1/00* (2006.01)
*B62K 11/00* (2006.01)
(52) U.S. Cl.
USPC ............................ 280/286; 180/228; 280/284
(58) Field of Classification Search .................. 180/227, 180/228; 280/284, 285, 286
See application file for complete search history.

(56) References Cited

U.S. PATENT DOCUMENTS

| 4,614,507 | A | * | 9/1986 | Ishino | 474/101 |
| 4,753,314 | A | | 6/1988 | Tsukiji | |
| 5,678,842 | A | * | 10/1997 | Hook et al. | 280/646 |
| 5,839,536 | A | * | 11/1998 | Tanaka | 180/227 |
| 6,354,619 | B1 | * | 3/2002 | Kim | 280/651 |
| 7,086,658 | B2 | * | 8/2006 | Parigian | 280/284 |

(Continued)

FOREIGN PATENT DOCUMENTS

| JP | 62-113673 A | 5/1987 |
| JP | 62-238186 A | 10/1987 |

(Continued)

*Primary Examiner* — John Walters
*Assistant Examiner* — James Triggs
(74) *Attorney, Agent, or Firm* — Birch, Stewart, Kolasch & Birch, LLP (57) ABSTRACT

A non-uniform load is prevented from acting on a cross member to reduce the weight of the cross member in a saddled vehicle.

In the saddled vehicle has a vehicle body frame 11 for suspending an engine 12, a swing arm 14 for suspending a rear wheel WR freely swingably, pivot portions 29 which are formed as a right-and-left pair, constitute a part of the vehicle body frame 11 and pivotably support the swing arm 14, a lower cross member 28 for joining the pivot portions 29, a rear cushion 32 for applying elastic force to the swing arm 14, a link mechanism 31 for joining the lower end 32A of the rear cushion 32, the swing arm 14 and the pivot portions 29, a link joint stay 70 which is formed at the rear side of the lower cross member 28 and joins the link mechanism 31, and a lower hunger 48 that is formed at the front side of the lower cross member 28 and fixes the engine 12, the link joint stay 70 and the lower hunger 48 are formed at the same position with respect to the vehicle width direction.

4 Claims, 7 Drawing Sheets

U.S. PATENT DOCUMENTS

| | | | | |
|---|---|---|---|---|
| 7,178,620 B2 * | 2/2007 | Toyoda | ........................ | 180/227 |
| 7,188,859 B2 * | 3/2007 | Hardin et al. | ................ | 280/652 |
| 7,281,721 B2 * | 10/2007 | Hudson et al. | ............... | 280/86.5 |
| 2004/0195799 A1 * | 10/2004 | Toyoda | ........................ | 280/284 |
| 2009/0212536 A1 * | 8/2009 | Tadeo | ......................... | 280/655 |

FOREIGN PATENT DOCUMENTS

| | | |
|---|---|---|
| JP | 2-54693 U | 4/1990 |
| JP | 8-99671 A | 4/1996 |
| JP | 2007-62618 A | 3/2007 |

\* cited by examiner

SADDLED VEHICLE

TECHNICAL FIELD

The present invention relates to a saddled vehicle having a link mechanism provided to a rear cushion.

BACKGROUND ART

There has been hitherto known a saddled vehicle in which a vehicle body frame has a pair of right and left pivot plates, a cross member for connecting the lower ends of the right and left pivot plates is provided, a pair of engine mounting bosses are provided to the front portion of the cross member, and a pair of rear cushion link bosses to which a rear cushion is linked is provided to the rear portion of the cross member (for example, see Patent document 1).

PRIOR ART DOCUMENT

Patent Document

Patent Document 1: JP-A-2007-62618

SUMMARY OF THE INVENTION

Problem to be Solved by the Invention

However, in the conventional saddled vehicle described above, the pair of engine mounting bosses and the pair of rear cushion link bosses are arranged to be offset from each other in the width direction of the vehicle. Therefore, a load transmitted from the rear cushion through the cross member to an engine acts so that the cross member is bent, so that a non-uniform load may act on the cross member. Therefore, it has been necessary to use a large-size cross member having high strength and thus it has been difficult to reduce the weight of the saddled vehicle.

The present invention has been implemented in view of the foregoing situation, and has an object to prevent a non-uniform load from acting on a cross member in a saddled vehicle and reduce the weight of the saddled vehicle.

Means of Solving the Problem

In order to solve the above problem, according to the present invention, a saddled vehicle having an engine, a vehicle body frame for suspending the engine, a swing arm for suspending a rear wheel freely swingably, pivot portions that are configured as a right-and-left pair to constitute a part of the vehicle body frame and pivotably support the swing arm, a cross member for joining the pair of right and left pivot portions, a rear cushion for applying elastic force to the swing arm, a link mechanism for joining the rear cushion, the swing arm and the pivot portions, a link joint portion that is formed at a rear side of the cross member to join the link mechanism, and an engine joint portion that is formed at a front side of the cross member to fix the engine, is characterized in that the link joint portion and the engine joint portion are formed at the same position with respect to a vehicle width direction.

According to this construction, the engine joint portion and the link joint portion which are formed at the front and rear sides of the cross member respectively are formed at the same position with respect to the vehicle width direction. Therefore, the load transmitted from the rear cushion through the link joint portion, the cross member and the engine joint portion can be linearly transmitted to the engine side. Accordingly, a non-uniform load can be prevented from acting on the cross member, and thus it is unnecessary to increase the strength of the cross member, so that the weight of the cross member can be reduced.

Furthermore, in the above construction, each of the link joint portion and the engine joint portion may be formed of a plate-like member so as to be separate from the cross member, and the link joint portion and the engine joint portion may be brought into contact with each other at least partially and continuously welded and fixed to the cross member.

According to this construction, the link joint portion and the engine joint portion are configured to be separate from each other. Therefore, the shapes of the link joint portion and the engine joint portion can be arbitrarily set, and the degree of freedom of design can be enhanced. In addition, the link joint portion and the engine joint portion can be divisionally assembled, so that the assembling performance can be enhanced. Furthermore, the link joint portion and the engine joint portion can be fixed in contact with each other, and continuously welded to the cross member. Therefore, the contact portions thereof can be also welded to each other at the welding time of the cross member, so that the welding work can be facilitated and the link joint portion and the engine joint portion can be firmly joined to each other. Accordingly, the load can be effectively transmitted from the link joint portion to the engine joint portion, and the shared load applied to the cross member can be reduced, so that the weight of the cross member can be further reduced.

The link member of the link mechanism joined to the link joint portion may be configured so as to be upwardly swung with respect to the cross member when the rear cushion is compressed and apply the tension load (pulling load) to the link joint portion, and the contact portion at which the link joint portion and the engine joint portion come into contact with each other may be formed below the cross member.

In this case, the tension load applied to the link joint portion can be effectively transmitted through the contact portion between the link joint portion and the engine joint portion which is formed below the cross member. Accordingly, the shared load applied to the cross member can be reduced, and the weight of the cross member can be reduced.

One end of the link joint portion in the up-and-down direction may be crooked.

In this case, the crooked portion acts as a rib, and the strength and rigidity of the link joint portion is enhanced, and thus the weight can be reduced. Furthermore, the weld length can be set to be longer by the amount corresponding to the crooked portion, and thus the weld strength can be enhanced.

The engine joint portion may be designed like a flat plate.

In this case, the engine joint portion is designed in a flat-plate shape, and it can sag moderately. Therefore, at the joint portion between the engine joint portion and the engine, the engine joint portion slightly sags, whereby the tolerance of clearance between the engine joint portion and the engine can be absorbed and the fastening force for fixing the engine can be made uniform.

Furthermore, the cross member may be formed of a pipe member having a circular cross-section.

In this case, the link joint portion and the engine joint portion are welded to the cross member having a circular cross-section. Therefore, the stress of the welded portion is uniform, and the concentration of stress can be avoided, so that the weight can be reduced and the productivity can be enhanced.

The link joint portion and the engine joint portion may be integrally formed of a plate-like member.

In this case, the link joint portion and the engine joint portion are integrally formed, and thus the load can be effectively transmitted between the link joint portion and the engine joint portion. Accordingly, the shared load applied to the cross member can be reduced, and the weight can be reduced.

Effect of the Invention

In the saddled vehicle according to the present invention, the engine joint portion and the link joint portion formed at the front and rear sides of the cross member are formed at the same position with respect to the vehicle width direction, and thus the load transmitted through the link mechanism can be linearly transmitted to the engine side. Accordingly, a non-uniform load can be prevented from being applied to the cross member, and thus it is unnecessary to increase the strength of the cross member, so that the weight can be reduced.

Furthermore, the link joint portion and the engine joint portion are configured to be divided from each other. Therefore, the shapes of the link joint portion and the engine joint portion can be arbitrarily set, and the degree of freedom of design can be enhanced. In addition, the link joint portion and the engine joint portion can be divisionally assembled, so that the assembling performance can be enhanced. Furthermore, the link joint portion and the engine joint portion can be fixed in contact with each other, and continuously welded to the cross member. Therefore, the contact portions thereof can be also welded to each other at the welding time of the cross member, so that the welding work can be facilitated and the link joint portion and the engine joint portion can be firmly joined to each other. Accordingly, the load can be effectively transmitted from the link joint portion to the engine joint portion, and the shared load applied to the cross member can be reduced, so that the weight can be further reduced.

Furthermore, the tension load applied to the link joint portion can be effectively transmitted through the contact portion between the link joint portion and the engine joint portion. Accordingly, the shared load applied to the cross member can be reduced, and thus the weight can be reduced.

Furthermore, the crooked portion of the link joint member acts as a rib, and thus the strength and rigidity of the link joint portion are enhanced. Therefore, the weight can be reduced. The weld length can be set to be longer by only the amount corresponding to the crooked portion, and the weld strength can be enhanced.

Still furthermore, the engine joint portion is designed like a flat plate, and thus it can sag moderately. Therefore, the sagging of the engine joint portion can absorb the tolerance of the clearance between the engine joint portion and the engine, and thus the fastening force for fixing the engine can be made uniform.

Furthermore, the link joint portion and the engine joint portion are welded to the cross member having the circular cross-section. Therefore, the stress at the welded portion is uniform, and thus the concentration of the stress can be avoided, so that the weight can be reduced and the productivity can be enhanced.

Still furthermore, the link joint portion and the engine joint portion are formed integrally with each other, and thus the load can be effectively transmitted between the link joint portion and the engine joint portion. Accordingly, the shared load applied to the cross member can be reduced, and the weight can be reduced.

BEST MODE FOR CARRYING OUT THE INVENTION

A vehicle according to an embodiment of the present invention will be described hereunder with reference to the drawings. In the following description, the up-and-down, front-and-rear and right-and-left directions are defined as directions when viewed from a driver of the vehicle.

Figure 1:
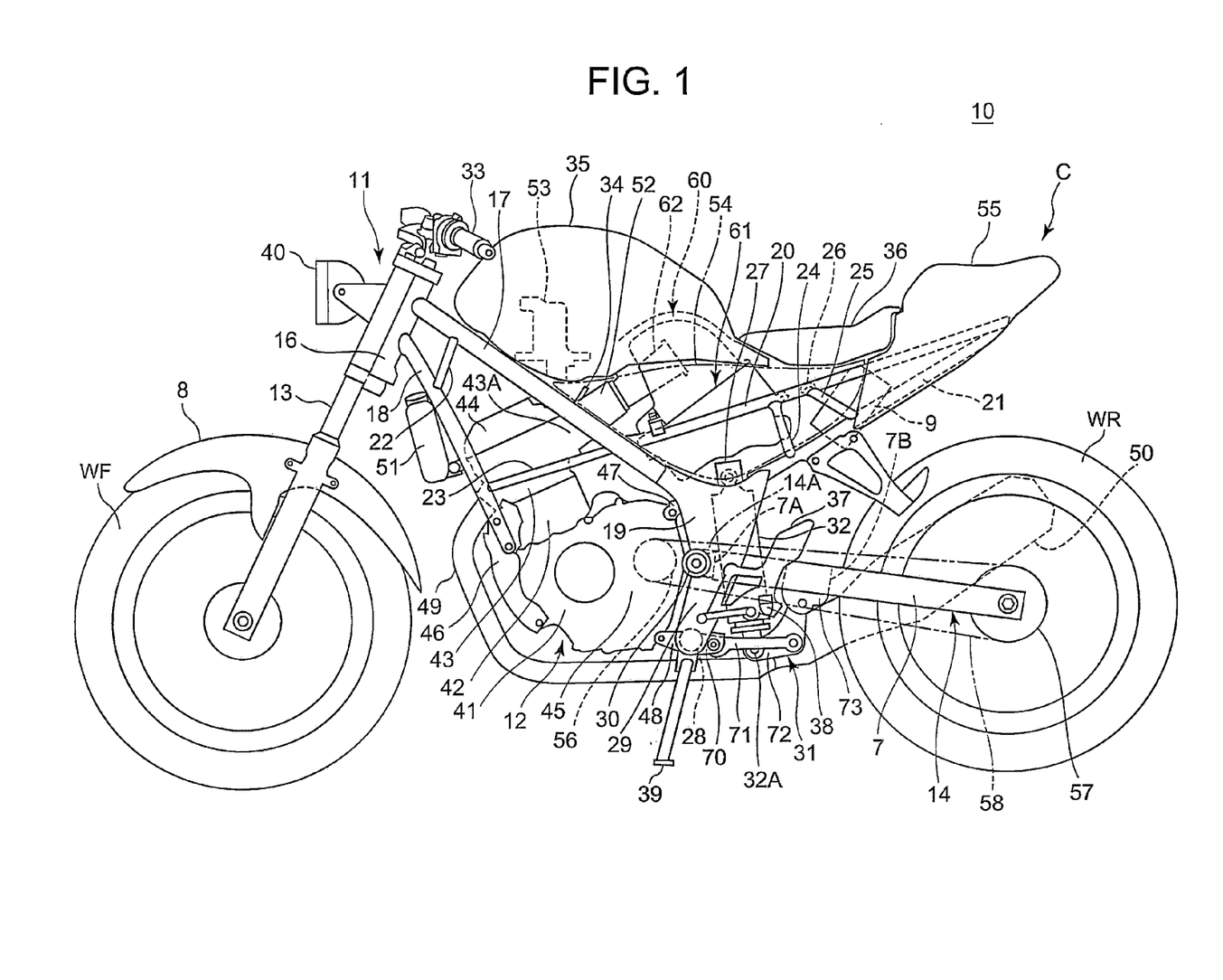
FIG. 1 is a left side view showing a two-wheeled motor vehicle according to an embodiment of the present invention.

FIG. 1 is a left side view of a two-wheeled motor vehicle 10 according to an embodiment of the present invention.

The two-wheeled motor vehicle 10 (saddled vehicle) is a saddled vehicle in which an engine 12 (internal combustion engine) is disposed at the center portion of a vehicle body frame 11, a front fork 13 is steerably supported at the front end of the vehicle body frame 11, and a swing arm 14 is supported at the lower portion of the rear portion of the vehicle body frame so as to be swingable in the up-and-down direction.

The vehicle body frame 11 is configured to have a head pipe 16 for steerably supporting the front fork 13, a pair of right and left main frames 17 extending from the upper portion of the head pipe 16 downwards and rearwards, a pair of right and left down frames 18 extending from the lower portion of the head pipe 16 downwards and rearwards, a pair of right and left center frames 19 extending from the rear ends of the main frames 17 downwards at an intermediate portion in the front-and-rear direction of the vehicle, a pair of right and left seat rails 20 extending upwards and rearwards from the rear portions of the main frames 17 to the rear portion of the vehicle, and a pair of right and left sub frames 21 for joining the upper rear ends of the main frame 17 to the rear ends of the seat rails 20.

Reinforcing frames 22, 23 for joining the main frames 17 and the down frames 18 are provided at the rear side of the head pipe 16 and at the sides of the engine 12. Furthermore, reinforcing frames 24, 25 for joining the seat frames 20 and the sub frames 21 are provided at the rear side of the center frames 19. The respective reinforcing frames 22, 23, 24, 25 are provided as left-and-right pairs.

A seat lower cross member 26 for joining the right and left seat rails 20 is provided at an intermediate portion of the seat rails 20. An upper cross member 27 for joining the right and left center frames 19 is provided to the upper portions of the center frames 19, and a lower cross member 28 (cross member) for joining the lower portions of the right and left center frames 19 is provided to the lower portions of the center frames 19.

The right and left center frames 19 have plate-like pivot portions 29 extending downwardly from the upper portions at which the main frames 17 and the seat rails 20 are joined to one another, respectively. The pivot portions 29 are provided as a right-and-left pair, and a pivot shaft 30 penetrates through the intermediate portions of the right and left pivot portions 29 in the up-and-down direction so as to freely pivotably support the swing arm 14. The pivot shaft 30 is disposed in parallel to the width direction of the vehicle.

The swing arm 14 has a pair of right and left arms extending in the front-and-rear direction, and the right and left arms 7 are joined to each other by a front cross portion 7A provided at a front side and a rear cross portion 7B provided in front of a rear wheel WR.

The pivot shaft 30 penetrates through the front end portions 14A of the swing arm 14, and the swing arm 14 extends rearwards with the front end portions 14A serving as the swing centers. The rear wheel WR as a driving wheel is supported by the rear end of the swing arm 14.

A link mechanism 31 joined to the lower cross member 28 is joined to the lower portion of the swing arm 14. A rear cushion 32 for elastically supporting the swing arm 14 is joined to the upper cross member 27 at the upper end thereof, and also joined to the link mechanism 31 at the lower end thereof. The rear cushion 32 extends in the up-and-down direction so as to pass through the front cross portion 7A and the rear cross portion 7B of the swing arm 14.

A steering handle 33 is secured to the upper portion of the front fork 13, and a front wheel WF is secured to the lower portion of the front fork 13. A fuel tank 35 for stocking fuel is disposed above the main frames 17 so as to straddle the right and left main frames 17 and extend from the rear side of the head pipe 16 to the upper side of the center frames 19. That is, the fuel tank 35 is disposed above the front portion of the vehicle body frame 11. Furthermore, the fuel tank 35 contains a fuel pump 53 for supplying fuel to the engine 12.

A seat 36 for a driver provided so as to straddle the right and left seat rails 20 is disposed above the seat rails 20 continuously with the rear end of the fuel tank 35, and extends rearwards along the seat rails 20. The seat 36 is locked by a lock mechanism (not shown) provided to the rear portion of the seat 36, and the driver or the like can freely detach the seat 36 by releasing the lock mechanism. A battery 9 is disposed in a space surrounded by the right and left seat rails 20 and the sub frames 21 below the rear portion of the seat 36.

Stays 37 extending from the rear portion of the pivot portions 29 rearwards are provided to the right and left center frames 19, and main steps 38 on which the driver puts his/her foots are provided to the right and left stays 37.

A side stand 39 which is freely foldable is secured to the lower end of the left-handed center frame 19. A head light 40 is provided in front of the head pipe 16.

The engine 12 is a water-cooling 4-cycle single-cylinder engine, and it is provided so that a cylinder axis is slightly tilted forwardly. A cylinder block 42 in which a piston slides, a cylinder head 43 and a cylinder head cover 44 are provided in this order from the side of a crank case 41 in which a crank shaft is mounted. A transmission 45 is integrally provided to the rear portion of the crank case 41.

The engine 12 is supported on the vehicle body frame 11 while a front hunger 46 joined to the front portion of the crank case 41 is fastened to the lower ends of the down frames 18 and the upper portion of the rear side of the crank case 41 is fastened to a rear hunger 47 extending from the upper portions of the center frames 19. Furthermore, in the engine 12, a lower joint portion 41A formed at the lower portion of the rear portion of the crank case 41 is also fixed to the vehicle body frame 11 by a lower hunger 48 (engine joint portion) extending from the lower cross member 28. The engine 12 is suspended to the lower side of the vehicle body frame 11 as a whole.

A drive sprocket 56 for outputting the rotation of the engine 12 is provided to the left side surface of the rear portion of the crank case 41. A driven sprocket 57 is provided to the left side surface of the rear wheel WR, and the rear wheel WR is driven by a chain 58 wound around the drive sprocket 56 and the driven sprocket 57.

An exhaust pipe 49 is connected to the front portion of the cylinder head 43. The exhaust pipe 49 passes from the front side of the crank case 41 through the lower side of the crank case 41 and extends rearwards, and a muffler 50 which extends to the upper rear side is connected to the rear end of the exhaust pipe 49.

Furthermore, a radiator 51 is secured to the front portion of the down frame 18.

An air intake device 60 for taking air to be supplied to the engine 12 is disposed below the rear portion of the fuel tank 35 and above the center frames 19.

The air intake device 60 has a box-shaped air leaner case 61 for cleaning intake air and a connecting tube 62 projecting forward from the air cleaner case 61. A throttle body 52 for adjusting the amount of air to be supplied to the engine 12 is connected to the front end of the connecting tube 62, and the throttle body 52 is connected to an air intake port 43A at the rear portion of the cylinder head 43. The throttle body 52 is provided with an injector 34, and fuel in the fuel tank 35 is supplied to the injector 34 by a fuel pump 53.

Furthermore, the air cleaner case 61 is located above the rear side of the cylinder head 43, and the connecting tube 62 and the throttle body 52 are arranged to be linearly tilted to the front lower portion to the air intake port 43A of the cylinder head 43.

The two-wheeled motor cycle 10 has a vehicle body cover C formed of resin, and the vehicle body cover C has a pair of right and left side covers 54 which cover the sides of the air intake device 60, and a rear cover 55 which covers the sub frames 21 and the seat rails 20 at the rear side of the seat 36. Specifically, the side covers 54 cover the side surface portions of the vehicle which are surrounded by the lower edges of the fuel tank 35 and the seat 36 and the upper edges of the main frames 17, the center frames 19 and the sub frames 21.

The upper side of the front wheel WF is covered by a front fender 8 secured to the front fork 13.

Figure 2:
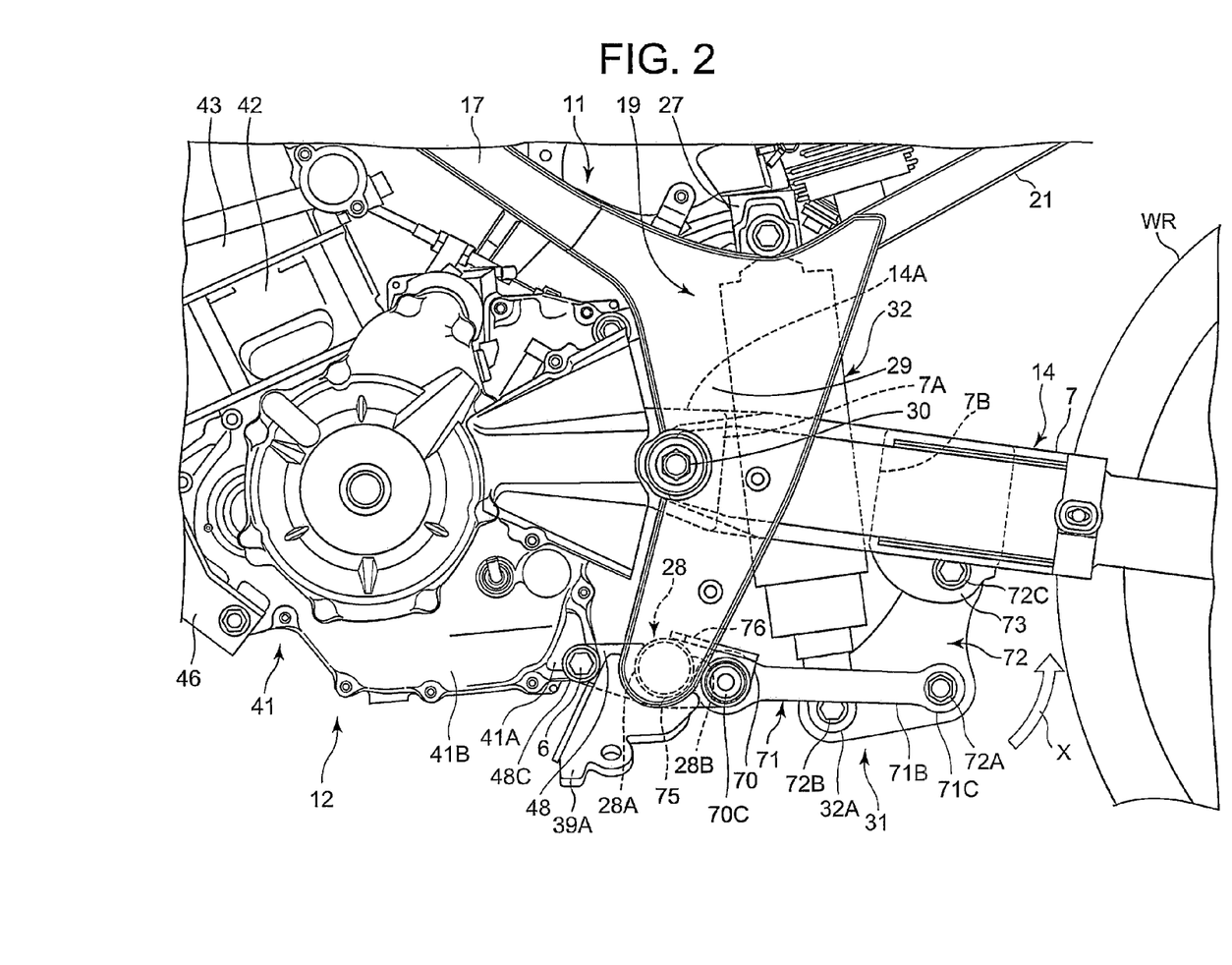
FIG. 2 is a left side view showing a pivot portion and the surrounding thereof.
Figure 3:
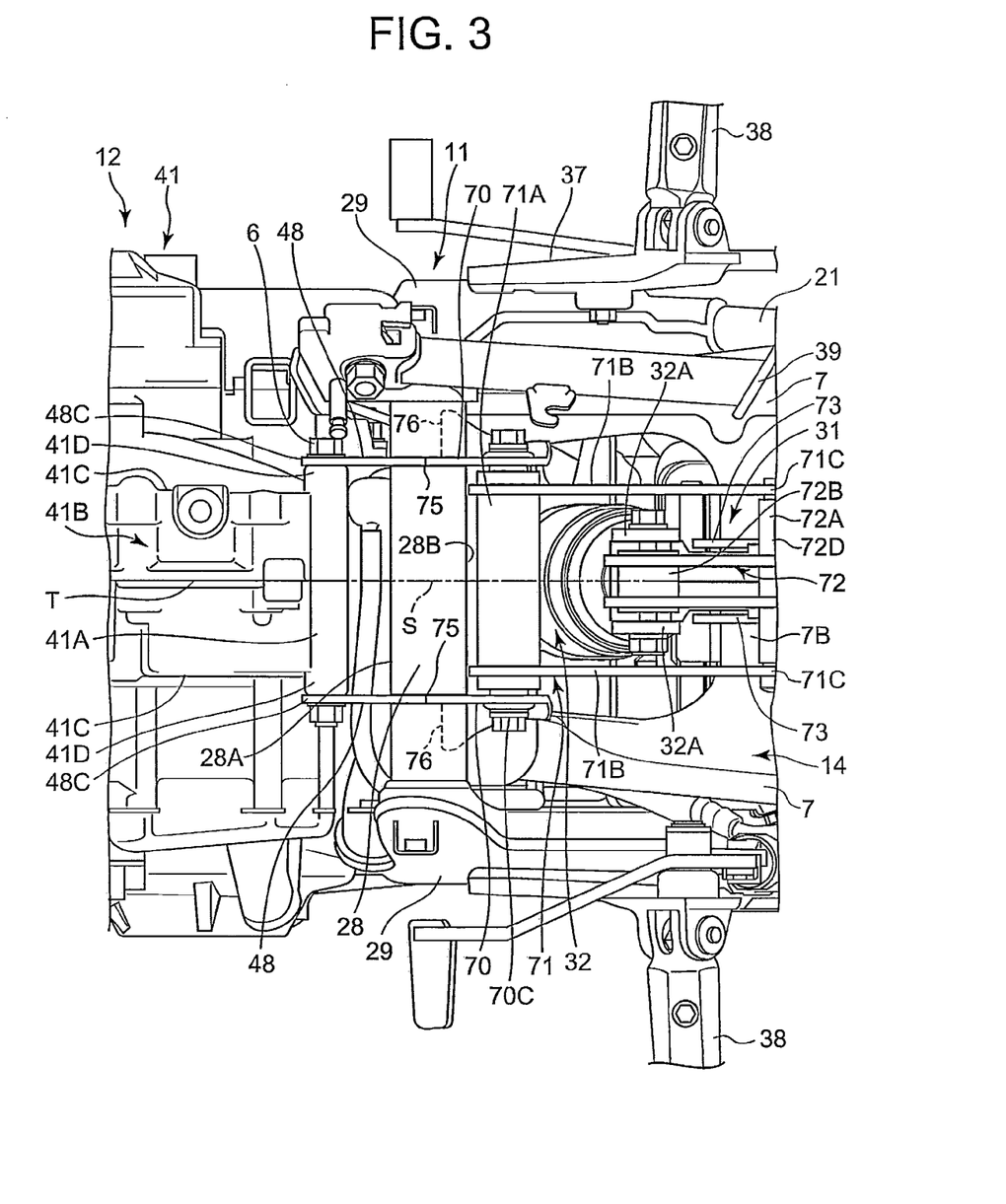
FIG. 3 is a view showing the periphery of a lower cross member when viewed from the lower side of the vehicle.

FIG. 2 is a left side view showing the pivot portion 29 and the periphery thereof. FIG. 3 is a view showing the periphery of the lower cross member 28 when viewed from the lower side of the vehicle. Here, FIG. 2 shows a state that the parts of the side stand 39, the stays 37, etc. are detached.

As shown in FIGS. 2 and 3, a crank case 41 is disposed at the front side of the pivot portion 29, and an oil pan 41B swelling downwardly is provided to the lower portion of the crank case 41. The oil pan 41B is provided integrally with the crank case 41, and a lower joint portion 41A to which the lower hunger 48 is joined is formed so as to project rearwards from the rear portion of the oil pan 41B.

The engine 12 is a single cylinder engine. The size of the crank case 41 in the width direction is relatively small, and thus the crank case 41 is configured to be divided into right and left parts in the width direction of the vehicle. The dividing line T of the crank case 41 appears to extend in the front-and-rear direction of the vehicle as shown in FIG. 3.

Therefore, the oil pan 41B provided to the lower portion of the crank case 41 can be formed integrally with the crank case 41, and thus the rigidity and strength of the periphery of the oil pan 41 can be kept to be higher as compared with the construction that a separate oil pan is provided at the lower side of the crank case which is configured to be vertically divided in a multicylinder engine or the like. Accordingly, the oil pan 41B can receive a relatively large load, and thus the lower joint portion 41A serving as a support portion for the engine 12 can be provided at the lower portion of the oil pan 41B.

The lower cross member 28 is formed of a pipe member whose cross-section is circular, and it is suspended between the lower ends of the right and left pivot portions 29. Both the ends of the lower cross member 28 are welded and fixed to the pivot portions 29. Furthermore, a stand stay 39A to which the side stand 39 is secured is formed at the lower end of the left pivot portion 29.

The lower hunger 48 is formed like a flat plate extending in the front-and-rear direction, and a pair of right and left lower hungers 48 are fixed to both the end sides in the vehicle width direction on the lower cross member 28.

Furthermore, the pair of right and left lower hungers 48 are located so as to be spaced from a center line S in the vehicle width direction at a substantially equal distance.

The lower hungers 48 are provided so as to project forwardly from the front portion 28A of the lower cross member 28, and fastened to the lower joint portion 41A by engine fixing bolts 6 which are inserted into engine fixing portions 48C at the front end. The engine fixing bolts 6 are provided so as to penetrate through the lower joint portion 41A.

Furthermore, as shown in FIG. 3, the lower hungers 48 are disposed outside the end faces 41C of the lower portion of the oil pan 41B with respect to the vehicle width direction, and the lower joint portion 41A has bulky portions 41D projecting in the vehicle width direction in conformity with the positions of the lower hungers 48.

In this embodiment, the lower hungers 48 are designed like a flat plate, and they moderately sag. Therefore, the lower hunger 48 slightly sags between the lower joint portion 41A of the crank case 41 and the lower hunger 48, and thus the tolerance of clearance between the lower joint portion 41a and the lower hunger 48 can be absorbed. Therefore, the fastening force between the lower hunger 48 and the lower joint portion 41A can be stabilized.

Link joint stays 70 (link joint portions) to which link mechanisms 31 are joined are formed at the rear portion 28B of the lower cross member 28. The link joint stays 70 are formed of plate-like members extending in the front-and-rear direction, and are provided a pair of right and left link joint stays 70 projecting rearwards from the rear portion 28B of the lower cross member 28. Specifically, the link joint stays 70 are continuous with the rear portions of the right and left lower hungers 48, and arranged on the same line as the link joint stays 70. A link mechanism joint portion 70C for freely swingably supporting the link mechanism 31 is provided to the rear portion of each link joint stay 70.

The link mechanism 31 has a link arm 71 (link member) joined to the link mechanism joint portion 70C, and a link plate 72 joined to the link arm 71, the swing arm 14 and the rear cushion 32.

The link arm 71 has a shaft portion 71A extending in the vehicle width direction, and a pair of right and left arm portions 71B extending rearwards respectively from both the ends of the shaft portion 71A. The right and left arm portions 71B extend rearwards along both the outsides of the lower end 32A of the rear cushion 32, and the interval between the right and left arm portions 71B is set to be larger than the width of the lower end 32A.

The link plate 72 is designed in a substantially triangular shape, and an arm joint portion 72A joined to the link arm 71, a cushion joint portion 72B joined to the lower end 32A of the rear cushion 32 and a swing arm joint portion 72C joined to the swing arm 14 are provided at the respective apexes of this triangle. As shown in FIG. 3, the arm joint portion 72A has a shaft portion 72D which is formed to project in the width direction in conformity with the width between the right and left arm portions 71B.

A pair of right and left plate joint portions 73 projecting downwardly are formed at the lower portion of the rear cross portion 7B of the swing arm 14. The link plate 72 is pivotably supported so as to be freely swingable through the linkage between the swing arm joint portion 72C and the plate joint portion 73.

The arm joint portion 72A is located below the swing arm joint portion 72C, the right and left arm portions 71B extend rearwards along the outsides of both the side surfaces of the link plates 72, and the joint portion 71C provided to the rear end of each arm portion 71B is pivotably supported on the arm joint portion 72A so as to be freely swingable.

The cushion joint portion 72B is located in front of the arm joint portion 72A, and the lower end 32A of the rear cushion 32 passes between the right and left arm portions 71B, and is pivotably supported on the cushion joint portion 72B so as to be freely swingable.

Figure 4:
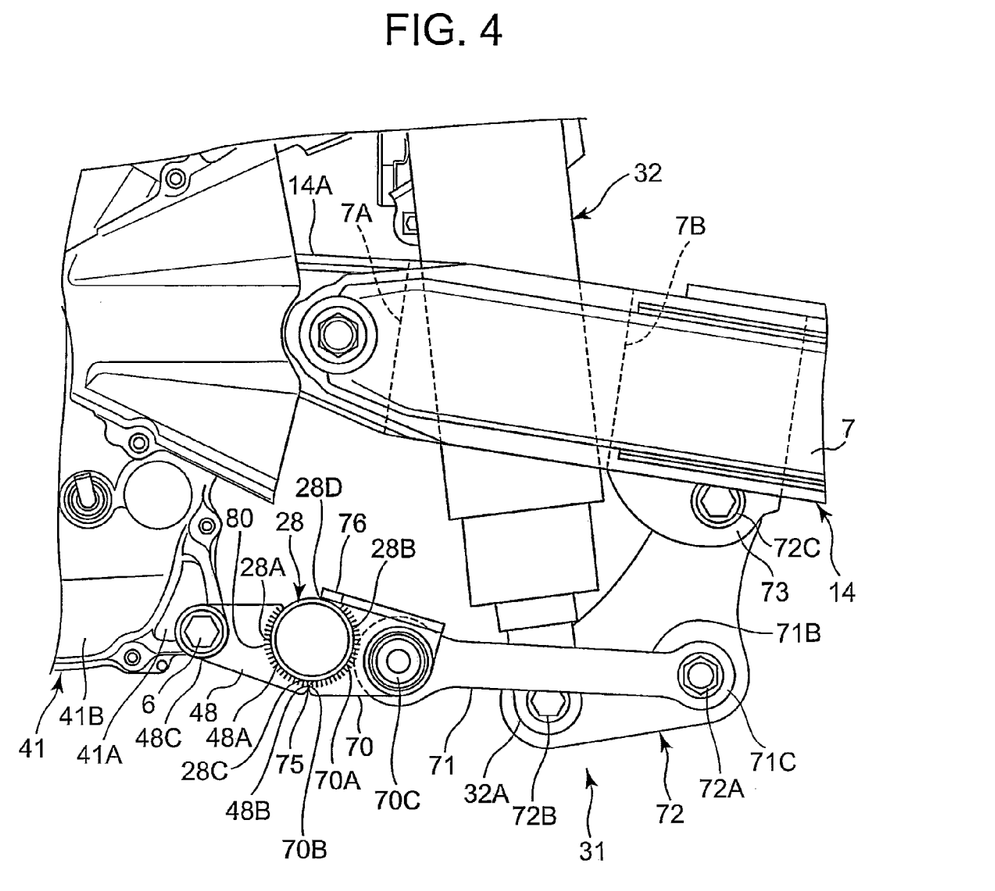
FIG. 4 is a side view showing the periphery of a link mechanism.
Figure 5:
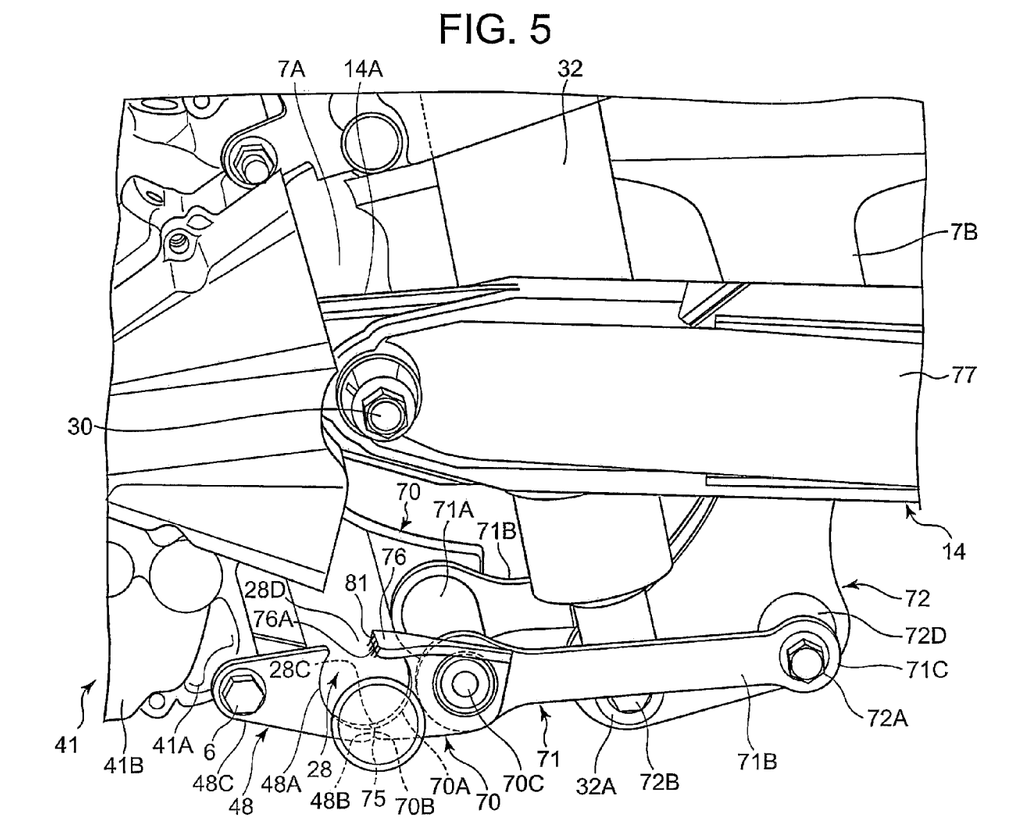
FIG. 5 is a perspective view showing the periphery of the link mechanism.

FIG. 4 is a side view showing the periphery of the link mechanism 31. FIG. 5 is a perspective view showing the periphery of the link mechanism 31. Here, in FIGS. 4 and 5, the pivot portion 29 is omitted from the illustration.

As shown in FIGS. 4 and 5, each lower hunger 48 has an arcuate joint portion 48A which is designed to be arcuate along the outer peripheral shape of the circular cross-section of the lower cross member 28, and the arcuate joint portion 48A is welded and fixed to the front portion 28A. The lower edge of the arcuate joint portion 48A is joined to the lower end 28C of the lower cross member 28, and the upper edge of the arcuate joint portion 48A extends to an upper portion of the lower cross member 28 which is lower than the upper end 28D of the lower cross member 28.

Furthermore, the link joint stay 70 has an arcuate joint portion 70A which is formed to be arcuate along the outer peripheral shape of the circular cross-section of the lower cross member 28, and the arcuate joint portion 70A is welded and fixed to the rear portion 28B. The lower edge of the arcuate joint portion 70A is joined to the lower end 28c of the lower cross member 28 so as to be continuous with the lower edge of the arcuate joint portion 48A, and the upper edge of the arcuate joint portion 70A extends to the upper end 28D of the lower cross member 28. That is, the rear end 48B of the lower hunger 48 and the front end 70B of the link joint stay 70 are welded in contact with each other at the lower end 28C of the lower cross member 28, thereby forming a contact portion 75. The contact portion 75 is located at the center in the front-and-rear direction of the lower cross member 28.

The link joint stay 70 has a rib-shaped crook portion which is formed so that the upper end thereof is crooked outwards in the vehicle width direction. The rib-shaped crook portion 76 acts as a rib, and it makes it possible to enhance the strength and rigidity of the link joint stay 70, so that the plate thickness and size of the link joint stay 70 can be reduced and thus the weight of the link joint stay 70 can be reduced.

When the lower hungers 48 and the link joint stays 70 are welded to the lower cross member 28, the welding is performed so as to make a circuit of the outer periphery of the lower cross member 28 along the arcuate joint portion 48A and the arcuate joint portion 70A as shown in FIG. 4. That is, an arcuate continuous weld bead 80 is formed along the arcuate joint portion 48A and the arcuate joint portion 70A. Accordingly, the welding stress applied to the arcuate joint portion 48a and the arcuate joint portion 70A can be made uniform, and concentration of stress can be avoided, so that the plate thickness and size of the lower hungers 48 and the link joint stays 70 can be reduced and thus the weight thereof can be reduced. Furthermore, the contact portion 75 is welded by the continuous bead 80, and thus the lower hunger 48 and the link joint stay 70 can be firmly joined to each other.

As shown in FIG. 5, the front portion of the rib-shaped crook portion 76 has a contact portion 76A which is in contact with the upper surface of the lower cross member 28, and the contact portion 76A is welded and fixed to the lower cross member 28 by the bead 81. Accordingly, the welding length can be set to be longer by the amount corresponding to the contact portion 76A, and the welding strength can be enhanced.

Furthermore, the lower hunger 48 and the link joint stay 70 are constructed to be divided from each other. Therefore, the shapes of the lower hunger 48 and the link joint stay 70 can be arbitrarily set, and the degree of freedom of design can be enhanced. In addition, the right and left center frames 19 are joined to each other by the lower cross member 28, and then the lower hunger 48 and the link joint stay 70 are set and welded to each other from the front and rear sides of the lower cross member. Therefore, the assembling performance can be enhanced.

Here, a load transmitted from the link mechanism 31 through the lower cross member 28 to the engine 12 when the rear cushion 32 is actuated will be described.

In the two-wheeled motor vehicle 10, the swing arm 14 is swung around the pivot shaft 30 in a swing direction X as indicated by an arrow in FIG. 2 when a driver sits on the seat 36 or when force is applied from a road surface to the rear wheel WR so that the rear wheel WR is pushed up. In connection with this, the link plate 72 and the link arm 71 are upwardly swung as indicated by the swing direction X, and the rear cushion 32 is compressed between the upper cross member 27 and the cushion joint portion 72B. At this time, the link mechanism 31 suffers a load as reaction force of the compression of the rear cushion 32, and this load is transmitted from the link joint stay 70 through the lower cross member 28 and the lower hunger 48 to the crank case 41 of the engine 12. That is, in the two-wheeled motor vehicle 10, the load occurring when the rear cushion 32 is actuated is transmitted to the engine which is larger in weight and rigidity, and thus the load can be stably received.

Specifically, when the rear cushion 32 is compressed, the link joint stay 70 to which the link mechanism 31 is joined suffers a tension load through the link arm 71 so that the link joint stay 70 is pulled away from the lower cross member 28. In this embodiment, the lower hunger 48 and the link joint stay 70 are joined to each other by the contact portion 75 provided at the lower end 28C of the lower cross member 28. Therefore, the load can be directly transmitted from the link joint stay 70 to the lower hunger 48, and thus the load caused by the reaction force of the rear cushion 32 can be effectively transmitted to the engine 12. Accordingly, the shared load which is shared from the link joint stay 70 to the lower cross member 28 can be reduced, and thus the thickness or diameter of the lower cross member 28 can be reduced, and the weight of the two-wheeled motor vehicle 10 can be reduced.

Furthermore, as shown in FIG. 2, the link joint stay 70 and the lower hunger 48 are provided at the same position in the vehicle width direction, and thus the load of the rear cushion 32 which is transmitted through the right and left arm portions 71B of the link arm 71 can be directly transmitted to the engine 12 through the link joint stays 70 and the lower hungers 48. That is, the link joint stay 70 and the lower hunger 48 are not offset from each other in the vehicle width direction. Therefore, a non-uniform load can be prevented from acting on the lower cross member 28 and thus it is unnecessary to increase the strength of the lower cross member 28. Accordingly, the thickness or diameter of the lower cross member 28 can be reduced, and thus the weight of the lower cross member 28 can be reduced.

Furthermore, the right and left link joint stays 70 and the respective lower hungers 48 are located to be spaced from a center line S at substantially equal distances in the vehicle width direction. Therefore, a load which is uneven in the vehicle width direction can be prevented from acting on the lower cross member 28, and thus the weight of the lower cross member can be reduced.

As described above, according to the embodiment to which the present invention is applied, the lower hunger 48 and the link joint stay 70 formed at the front portion 28A and the rear portion 28B of the lower cross member 28 respectively are located at the same position with respect to the vehicle width direction. Therefore, the load transmitted from the rear cushion 32 through the link joint stay 70, the lower cross member 28 and the lower hunger 48 can be directly transmitted to the engine 12 side. Accordingly, an uneven load can be prevented from acting on the lower cross member 28, and thus it is unnecessary to increase the strength of the lower cross member 28, so that the thickness or diameter of the lower cross member 28 can be reduced and thus the weight of the lower cross member 28 can be reduced.

Furthermore, the link joint stay 70 and the lower hunger 48 are configured to be divided from each other. Therefore, the shapes of the link joint stay 70 and the lower hunger 48 can be arbitrarily set, the degree of freedom of design can be enhanced, and they can be segmented and assembled. Therefore, assembling performance can be enhanced. Furthermore, the link joint stay 70 and the lower hunger 48 can be fixed to each other in contact with each other, and the they are welded to the cross member with the continuous bead 80. Therefore, the contact portion 75 can be also welded at the welding time of the lower cross member 28. Therefore, the welding work can be facilitated, and the link joint stay 70 and the lower hunger 48 can be firmly joined to each other. Accordingly, the load can be effectively transmitted from the link joint stay 70 to the lower hunger 48, and the shared load acting on the lower cross member 28 can be reduced, so that the weight of the lower cross member 28 can be reduced.

Furthermore, the tension load applied to the link joint stay 70 can be effectively transmitted through the contact portion between the link joint stay 70 and the lower hunger 48 which is formed below the lower cross member 28. Accordingly, the shared load applied to the lower cross member 28 can be reduced, and thus the weight of the lower cross member 28 can be reduced.

Furthermore, the rib-shaped crook portion 76 acts as a rib, and it enhances the strength and rigidity of the link joint stay 70, so that the weight of the link joint stay 70 can be reduced. Furthermore, the welding length can be set to be longer by the amount corresponding to the contact portion 76A of the rib-shaped crook portion 76, and thus the weld strength can be enhanced.

Furthermore, the lower hunger 48 is designed like a flat plate, and thus it can sag moderately. Therefore, the lower hunger 48 slightly sags between the lower hunger 48 and the lower joint portion 41A of the engine 12, whereby the tolerance of clearance between the lower hunger 48 and the lower joint portion 41A can be absorbed and the fastening force between the lower hunger 48 and the engine 12 can be made uniform.

The link joint stay 70 and the lower hunger 48 are welded to the lower cross member 28 having a circular cross-section, so that the stress of the arcuate joint portion 48A and the arcuate joint portion 70A is uniform, and concentration of stress can be avoided. Therefore, the weights of the link joint stay 70, the lower hunger 48 and the lower cross member 28 can be reduced, and the productivity can be enhanced.

The above embodiment shows an aspect to which the present invention is applied, and the present invention is not limited to the above embodiment.

In the above embodiment, the description is made under the assumption that the rear end 48B of he lower hunger 48 and the front end 70B of the link joint stay 70 are joined to each other while brought into contact with each other at the contact portion 75. However, the present invention is not limited to this style. it is unnecessary that the lower hunger 48 and the link joint stay 70 are brought into contact with each other insofar as the lower hunger 48 and the link joint stay 70 are provided at the same position with respect to the vehicle width direction. Furthermore, the other detailed construction of the two-wheeled motor vehicle may be arbitrarily modified.

Furthermore, in the above embodiment, the rear end 48B of the lower hunger 48 and the front end 70B of the link joint stay 70 are welded to each other at the lower end 28C of the lower cross member 28 with being in contact with each other at the contact portion 75. However, the present invention is not limited to this style, and plural contact portions may be provided or the lower hunger 48 and the link joint stay 70 may be formed integrally with each other. This case will be described as a modification.

Modification 1

Figure 6:
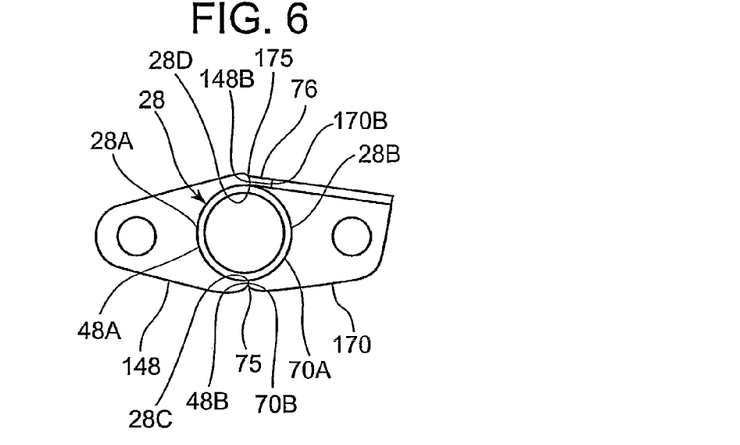
FIG. 6 is a side view showing a lower hunger and a link joint stay in a modification 1.

FIG. 6 is a side view showing a lower hunger 148 and a link joint stay 170 in a modification 1 of the embodiment.

In this modification 1, the parts having the same constructions as the above embodiment are represented by the same reference numerals, and the description thereof is omitted.

The lower hunger 148 fixed to the front portion 28A of the lower cross member 28 has a rear end 148B extending to the upper end 28D of the lower cross member 28. The link joint stay 170 fixed to the rear portion 28B of the link joint stay 170 has a tip 170B extending to the upper end 28D of the lower cross member 28. The rear end 148B and the tip 170B comes into contact with each other at the upper end 28D to form a contact portion 175.

In the modification 1, the lower hunger 148 and the link joint stay 170 are also welded to each other in contact with each other at the contact portion 175 of the upper end 28D in addition to the contact portion 75 of the lower end 28C. Therefore, the load can be effectively transmitted from the link joint stay 170 to the lower hunger 148, and the shared load applied to the lower cross member 28 can be further reduced, so that the weight of the lower cross member 28 can be more greatly reduced.

In the modification 1, the lower hunger 148 and the link joint stay 170 are in contact with each other at the contact portion 75 and the contact portion 175. However, they may be in partial contact with each other, and for example, they may be in contact with each other at only the contact portion 175.

Modification 2

Figure 7:
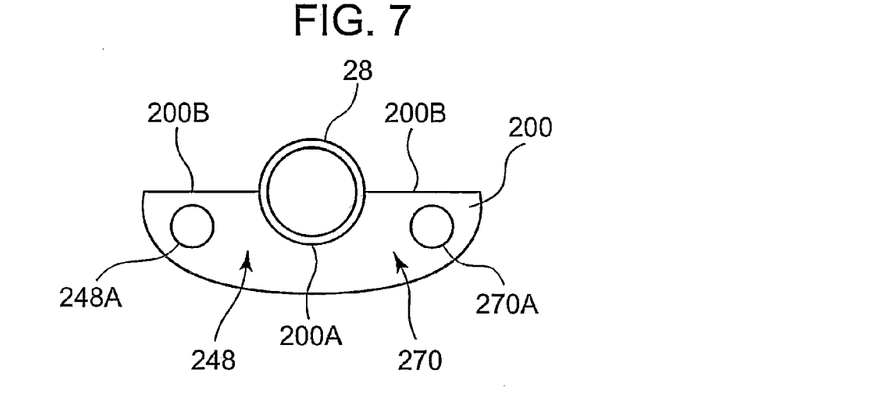
FIG. 7 is a side view showing a stay member in a modification 2.

FIG. 7 is a side view showing a stay member 200 in a modification 2 of the embodiment.

In this modification 2, the parts having the same constructions as the above embodiment are presented by the same reference numerals, and the description thereof is omitted.

The stay member 200 is formed like a flat plate extending in the front-and-rear direction of the vehicle. The stay member 200 has an arcuate joint portion 200A at an upper edge portion of an intermediate portion thereof in the front-and-rear direction, and the arcuate joint portion 200A is formed in an arcuate shape along the outer peripheral shape having the circular cross-section of the lower cross member 28. The arcuate joint portion 200A is welded and fixed to the lower surface side of the lower cross member 28. The stay member 200 is provided so that the upper edge 200B thereof is set to be substantially horizontal. The arcuate joint portion 200A is designed in a semicircular shape as a concaved portion, and it is fixed while fitted to a lower half portion of the outer periphery of the lower cross member 28 having the circular cross-section. Therefore, after the right and left center frames 19 are joined to each other through the lower cross member 28, the stay member 200 can be set from the lower side of the lower cross member 28 and welded to the lower cross member 28. Therefore, the assembling performance can be enhanced.

The stay member 200 has a lower hunger portion 248 (engine joint portion) fastened to the lower joint portion 41A at the front portion thereof so as to pinch the lower cross member 28, and an engine fixing portion 248A in which an engine fixing bolt 6 is inserted is formed in the lower hunger portion 248.

A link joint stay portion 270 (link joint portion) joined to the link mechanism 31 is provided to the rear portion so as to pinch the lower cross member 28, and a link mechanism joint portion 270A to which the link arm 71 is joined is formed in the link joint stay 270.

In the modification 2, the lower hunger 248 and the link joint stay portion 270 are provided integrally with the stay member 200. Therefore, the load can be effectively transmitted from the link joint stay portion 270 to the lower hunger portion 248, and the shared load applied to the lower cross member 28 can be reduced, so that the weight of the lower cross member 28 can be reduced. Furthermore, the link mechanism joint portion 270A, the engine fixing portion 248A and the arcuate joint portion 200A are integrally provided, and thus the position precision of the link mechanism joint portion 270A, the engine fixing portion 248A and the arcuate joint portion 200A can be enhanced, so that the productivity can be enhanced.

Modification 3

Figure 8:
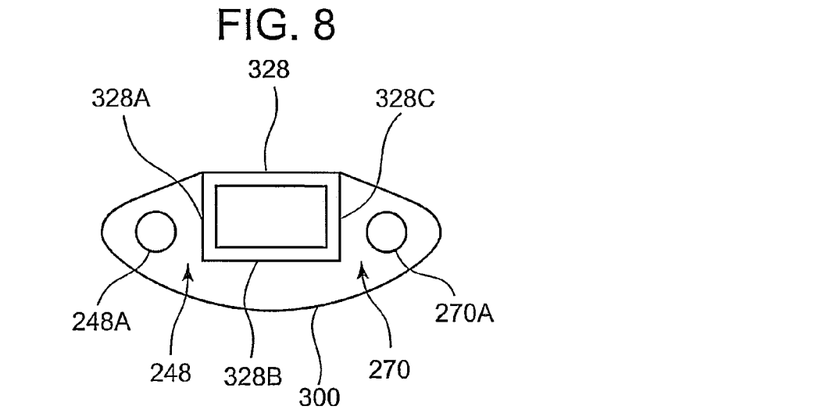
FIG. 8 is a side view showing a stay member in a modification 3.

FIG. 8 is a side view showing a stay member 300 in a modification 3 of the embodiment.

In this modification 3, the parts having the same constructions as the above modification are represented by the same reference numerals, and the description thereof is omitted.

In the modification 3, a pipe-like cross member for joining the lower portions of the right and left center frames 19 is constructed by a lower cross member 328 having a rectangular square cross-section.

The stay member 300 is formed like a flat plate extending in the front-and-rear direction of the vehicle. A link joint stay portion 270 and a lower hunger portion 248 are provided integrally with the stay member 300.

The stay member 300 has a recessed joint portion 300A at an upper edge portion of an intermediate portion thereof in the front-and-rear direction, and the recessed joint portion 300A is formed along the front surface 328A, lower surface 328B and rear surface 328C of the lower cross member 328, and the recessed joint portion 300A is welded and fixed to the front surface 328A, the lower surface 328B and the rear surface 328C of the lower cross member 28.

According to the modification 3, the recessed joint portion 300a can be engagedly fitted to the lower cross member 328 from the lower side thereof. Therefore, after the right and left center frames 19 are joined to each other through the lower cross member 328, the stay member 300 can be set and welded from the lower side of the lower cross member 28, and thus the assembling performance can be enhanced. Furthermore, the recessed joint portion 300A is engagedly fitted to the lower cross member 328, whereby the stay member 300 can be positioned in the vehicle front-and-rear direction and the vehicle up-and-down direction. Therefore, the productivity can be further enhanced. Furthermore, the lower cross member 328 is designed to have a square cross-section, and thus the rigidity of the lower cross member 328 can be enhanced.

Modification 4

Figure 9:
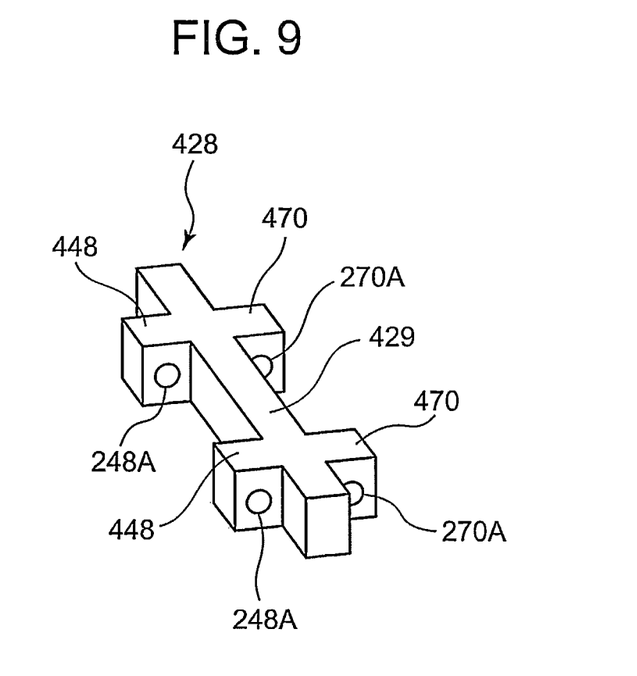
FIG. 9 is a perspective view showing a lower cross member in a modification 4.

FIG. 9 is a perspective view showing a lower cross member 428 in a modification 4 of the embodiment.

In this modification 4, the parts having the same constructions as the modification 2 are represented by the same reference numerals, and the description thereof is omitted.

In the modification 4, the cross member for joining the lower portions of the right and left center frames 19 is constructed by a lower cross member 428 having a rectangular square cross-section which is manufactured by casting.

The lower cross member 428 has a base portion 429 for joining the lower portions of the right and left center frames 19, lower hunger portions 448 (engine joint portions) projecting forwardly from the front surface of the base portion 429, and link joint stay portions 470 (link joint portions) projecting backwards from the rear surface of the base portion 429.

The base portion 429, the lower hunger portions 448 and the link joint stay portions 470 are integrally constructed by casting.

Engine fixing portions 248A are formed in the lower hunger portions 448, and link mechanism joint portions 270A are formed in the link joint stay portions 470.

The lower hunger portion 448 and the link joint stay portion 470 are formed at the same position with respect to the vehicle width direction. The lower hunger portion 448 and the link joint stay portion 470 are respectively provided as right-and-left pairs with respect to the vehicle width direction.

As described above, with respect to the lower cross member 428 manufactured by casting, the lower hunger 448 and the link joint stay portion 470 are also provided to be located on the same line. A non-uniform load can be prevented from acting on the base portion 429 and thus it is unnecessary to increase the strength of the base portion 429. Therefore, the thickness and size of the base portion 429 can be reduced, and thus the weight of the base portion 429 can be reduced.

DESCRIPTION OF REFERENCE NUMERALS 10 two-wheeled motor vehicle
11 vehicle body frame
12 engine (internal combustion engine)
20 seat rail (frame member)
20A frame-side fastening portion
35 fuel tank
36 seat
61 air cleaner case
61A, 61B divisional plane
62 connecting tube
63 opening for connecting tube
64 upper air cleaner case
64B rear wall portion (wall portion)
65 lower air cleaner case
66 opening for air intake duct
67 element holder
70 plate-like element
70A upper cleaning face (cleaning face)
70B lower cleaning face (cleaning face)
72 maintenance lid
72B lid-side guide portion
72C hook portion
72D lid fastening portion (fastening portion)
75 case-side fastening portion
78 tank-side stay (rear fastening portion)
91 element guide portion
WF front wheel
WR rear wheel

The invention claimed is:

1. A saddled vehicle having an engine, a vehicle body frame for suspending the engine, a swing arm for suspending a rear wheel freely swingably, pivot portions that are configured as a right-and-left pair to constitute a part of the vehicle body frame and pivotably support the swing arm, a cross member for joining the pair of right and left pivot portions, a rear shock absorber for applying elastic force to the swing arm, a link mechanism for joining the rear shock absorber, the swing arm and the pivot portions, a link joint portion that is formed at a rear side of the cross member to join the link mechanism, and an engine joint portion that is formed at a front side of the cross member to fix the engine, characterized in that the cross member is formed of a pipe member having a circular cross section, the link joint portion and the engine joint portion are formed at the same position with respect to a vehicle width direction, the link joint portion and the engine joint portion are formed of plate-like members so as to be separate from each other, the link joint portion and the engine joint portion are in contact with each other at least partially and continuously welded and fixed to the cross member, a link member of the link mechanism joined to the link joint portion is configured so as to be upwardly swung with respect to the cross member and apply a tension load to the link joint portion when the rear shock absorber is compressed, and a contact portion at which the link joint portion and the engine joint portion come into contact with each other is formed below the cross member, and the link joint portion and the engine joint portion are arranged to be spaced from each other at a distance smaller than the diameter of the cross member above the cross member.

2. The saddled vehicle according to claim 1, wherein one end of the link joint portion in an up-and-down direction is crooked.

3. The saddled vehicle according to claim 1, wherein the engine joint portion is formed like a flat plate.

4. The saddled vehicle according to claim 2, wherein the engine joint portion is formed like a flat plate.

* * * * *